J. D. COCHRAN.
Hand-Seeder.
No. 54,507.  Patented May 8, 1866.
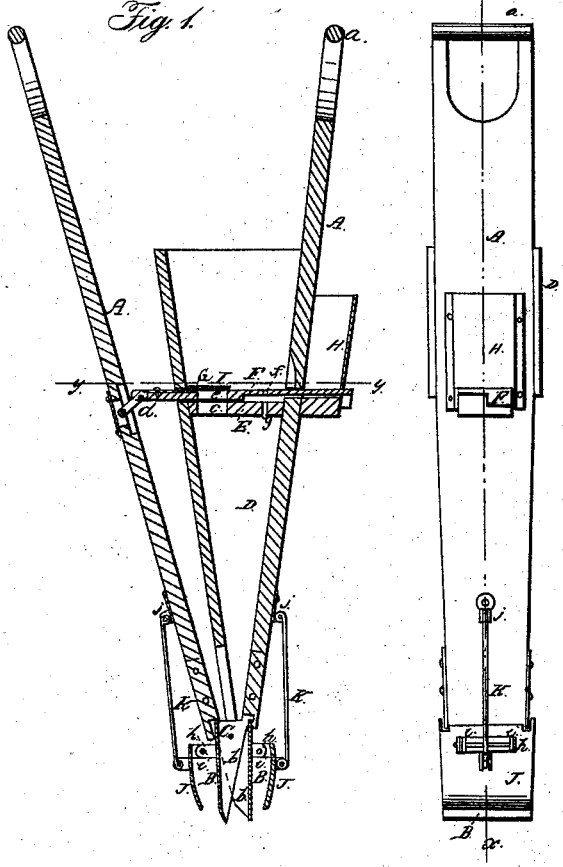
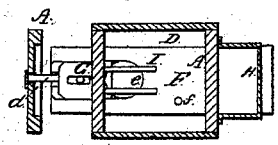
Witnesses:
Inventor:

UNITED STATES PATENT OFFICE.

J. D. COCHRAN, OF MILFORD, NEW HAMPSHIRE.

IMPROVEMENT IN CORN-PLANTERS.

Specification forming part of Letters Patent No. 54,507, dated May 8, 1866.

*To all whom it may concern:*

Be it known that I, JOHN D. COCHRAN, of Milford, in the county of Hillsborough and State of New Hampshire, have invented a new and Improved Corn-Planter; and I do hereby declare that the following is a full, clear, and exact description thereof, which will enable others skilled in the art to make and use the same, reference being had to the accompanying drawings, forming a part of this specification, in which—

Figure 1 is a vertical section of my invention, taken in the line $x\ x$, Fig. 2; Fig. 2, an elevation of the same; Fig. 3, a horizontal section of the same, taken in the line $y\ y$, Fig. 1.

Similar letters of reference indicate like parts.

This invention relates to a new and improved corn-planter of that class which are operated directly by hand and carried by the operator.

The object of the invention is to obtain a simple device for the purpose specified, and one which may be manipulated with the greatest facility—sow or distribute a fertilizer with the corn and cover the same perfectly.

A A' represent the flat strips, the upper ends of which are hollowed out and have bars $a$ attached to form handles for the operator to grasp. The lower ends of the flat strips A A' have metal plates B attached to them, connected by a pivot-bolt, C, the plates B having side flanges, $b$, the flanges of one plate working over those of the other. The pivot-bolt C passes through the upper parts of the plates B B, the latter serving to make the necessary opening in the ground to receive the corn when the upper ends of the strips A A' are distended or forced apart.

D represents a box or hopper which is attached to the inner side of the strip A, and is of V form in its side section. This box or hopper has a horizontal partition, E, fitted within it, through which a circular hole, $c$, is made.

The partition E has a groove made in it, extending its whole length, to receive a slide, F, which passes transversely through the box or hopper and is connected to the strip A' by a link, $d$. (Shown in Figs. 1 and 3.) This slide F has a hole, $e$, made in it, and a slide or gage, G, is applied to the hole in order that the capacity of the latter may be varied as desired.

To the outer side of the strip A there is attached a small hopper, H, through the bottom of which the slide F also passes and is allowed to work freely.

The slide F also has a small hole, $f$, made through it, and a corresponding hole, $g$, is made through the partition E. A cut-off, I, is secured to the inner side of the hopper D.

J J represent two plates, the upper ends of which are secured by pivot-bolts $h\ h$ to ears $i\ i$ at the outer sides of the upper parts of the plates B B. These plates J J have the lower ends of rods K pivoted to them, and the upper ends of said rods are pivoted to ears $j$, secured to the outer sides of the strips A A', as shown clearly in Fig. 1.

The operation is as follows: The hopper D, above the partition E, is supplied with a requisite quantity of seed-corn, and the small hopper H supplied with pulverulent manure. The plates B B, in a closed state, are thrust into the ground where a dropping of the corn is required, and the upper ends of the strips A A' are then forced apart, and in so doing the hole $e$ in the slide F is brought over the hole $c$ in the partition E, and the corn in $c$ drops through $e$, down through the hopper D, and passes out between the plates B B into the hole in the ground made by said plates, and the manure is also dropped at the same time, in consequence of the small hole $f$ in the slide F being brought over the hole $g$ in the partition E.

The cut-off I prevents the seed passing into hole $c$ when the latter is over hole $e$.

The plates J J prevent the plates B B from casting the earth too far aside, and insure the holes made by B B filling up as the latter are raised.

Having thus described my invention, I claim as new and desire to secure by Letters Patent—

1. The strips A A', with slide F, attached and provided with the plates B B, pivoted together, as shown, in combination with the hopper D, provided with the partition E, the slide and partition being provided with holes, and all arranged to operate substantially as set forth.

2. The manure or supplemental hopper H, applied to the strip A, in combination with the seed-hopper D and slide F, substantially as and for the purpose specified.

3. The plates J J, in combination with the plates B B, arranged to operate in connection therewith, substantially as and for the purpose set forth.

JOHN D. COCHRAN.

Witnesses:
E. G. HAMBLETT,
F. T. SAWYER.